(12) United States Patent
Buzaski et al.

(10) Patent No.: US 9,311,305 B2
(45) Date of Patent: Apr. 12, 2016

(54) ONLINE UPGRADING OF A DATABASE ENVIRONMENT USING TRANSPARENTLY-PATCHED SEED DATA TABLES

(71) Applicant: Oracle International Corporation, Redwood Shored, CA (US)

(72) Inventors: George Buzaski, Fremont, CA (US); Kevin Hudson, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 225 days.

(21) Appl. No.: 13/802,774

(22) Filed: Mar. 14, 2013

(65) Prior Publication Data

US 2014/0101645 A1 Apr. 10, 2014

Related U.S. Application Data

(60) Provisional application No. 61/707,823, filed on Sep. 28, 2012, provisional application No. 61/707,827, filed on Sep. 28, 2012, provisional application No. 61/707,840, filed on Sep. 28, 2012.

(51) Int. Cl.
G06F 9/44 (2006.01)
G06F 17/30 (2006.01)
G06F 9/445 (2006.01)

(52) U.S. Cl.
CPC ............ *G06F 17/30002* (2013.01); *G06F 8/65* (2013.01); *G06F 8/67* (2013.01); *G06F 8/68* (2013.01); *G06F 17/30174* (2013.01); *G06F 17/30595* (2013.01)

(58) Field of Classification Search
IPC ................... G06F 11/3672,17/30371, 17/3051, G06F 17/30292, 8/65; Y10S 707/99932, Y10S 707/99934
See application file for complete search history.

(56) References Cited

U.S. PATENT DOCUMENTS

| | | |
|---|---|---|
| 5,227,967 A | 7/1993 | Bailey |
| 5,315,709 A | 5/1994 | Alston et al. |
| 5,440,743 A | 8/1995 | Yokota et al. |

(Continued)

OTHER PUBLICATIONS

Non-final Office Action dated Mar. 8, 2010 for U.S. Appl. No. 11/875,478.

(Continued)

*Primary Examiner* — Tuan Vu
(74) *Attorney, Agent, or Firm* — Vista IP Law Group, LLP

(57) ABSTRACT

A method, system, and computer program product for managing upgrades of database systems using a transparently-patched seed data table. The method commences on a running system by copying (while software applications are running) portions of data comprising a seed data table to database table rows that are temporarily inaccessible by the software applications. The copy operation creates new rows (a seed data table copy) in a database table. The method continues while software applications are running by modifying the seed data table copy (e.g., by applying a patch). For a brief time, the method stops the software applications, then changes the database table rows that were temporarily inaccessible by the software applications to become accessible by the software applications and restarts the software application to point to the patched seed data table copy. The patch can add or change a column of the seed data table copy or its schema.

20 Claims, 13 Drawing Sheets

(56) References Cited

U.S. PATENT DOCUMENTS

| | | | |
|---|---|---|---|
| 5,448,727 A | 9/1995 | Annevelink | |
| 5,555,388 A | 9/1996 | Shaughnessy | |
| 5,608,903 A | 3/1997 | Prasad et al. | |
| 5,640,550 A | 6/1997 | Coker | |
| 5,717,924 A | 2/1998 | Kawai | |
| 5,978,426 A | 11/1999 | Glover et al. | |
| 6,016,497 A | 1/2000 | Suver | |
| 6,122,630 A | 9/2000 | Strickler et al. | |
| 6,122,640 A | 9/2000 | Pereira | |
| 6,138,112 A * | 10/2000 | Slutz | 707/748 |
| 6,173,313 B1 | 1/2001 | Klots et al. | |
| 6,268,850 B1 | 7/2001 | Ng | |
| 6,304,867 B1 | 10/2001 | Schmidt | |
| 6,324,535 B1 | 11/2001 | Bair et al. | |
| 6,363,387 B1 | 3/2002 | Ponnekanti et al. | |
| 6,460,055 B1 | 10/2002 | Midgley et al. | |
| 6,480,848 B1 | 11/2002 | DeKimpe et al. | |
| 6,519,613 B1 | 2/2003 | Friske et al. | |
| 6,598,059 B1 | 7/2003 | Vasudevan et al. | |
| 6,611,848 B1 | 8/2003 | Bradley | |
| 6,633,870 B1 | 10/2003 | Bradley | |
| 6,633,883 B2 | 10/2003 | Koskas | |
| 6,681,225 B1 | 1/2004 | Uceda-Sosa et al. | |
| 6,745,209 B2 | 6/2004 | Holenstein et al. | |
| 6,769,124 B1 | 7/2004 | Schoening et al. | |
| 6,801,983 B2 | 10/2004 | Abe et al. | |
| 6,834,290 B1 | 12/2004 | Pugh et al. | |
| 6,965,899 B1 | 11/2005 | Subramaniam et al. | |
| 7,028,057 B1 | 4/2006 | Vasudevan et al. | |
| 7,080,371 B1 * | 7/2006 | Arnaiz et al. | 717/170 |
| 7,237,238 B2 | 6/2007 | Peppers | |
| 7,310,653 B2 | 12/2007 | Coyle et al. | |
| 7,350,191 B1 | 3/2008 | Kompella et al. | |
| 7,421,458 B1 | 9/2008 | Taylor et al. | |
| 7,574,461 B1 | 8/2009 | Armorer et al. | |
| 7,603,669 B2 | 10/2009 | Curtis et al. | |
| 7,689,587 B1 * | 3/2010 | Tiruveedi et al. | 707/803 |
| 7,693,889 B1 | 4/2010 | Armorer et al. | |
| 8,087,013 B2 | 12/2011 | Kelly et al. | |
| 8,495,612 B2 | 7/2013 | Bertrand | |
| 8,793,230 B2 | 7/2014 | Engelko et al. | |
| 9,043,778 B2 | 5/2015 | Lin et al. | |
| 2002/0019972 A1 | 2/2002 | Grier et al. | |
| 2002/0087271 A1 | 7/2002 | Rozenshtein et al. | |
| 2002/0188650 A1 | 12/2002 | Lindsay et al. | |
| 2003/0041127 A1 | 2/2003 | Turnbull | |
| 2003/0154216 A1 | 8/2003 | Arnold et al. | |
| 2003/0217069 A1 | 11/2003 | Fagin et al. | |
| 2003/0229610 A1 | 12/2003 | Van Treeck | |
| 2004/0064487 A1 | 4/2004 | Nguyen et al. | |
| 2005/0015376 A1 | 1/2005 | Fraser et al. | |
| 2005/0108733 A1 | 5/2005 | Bermudez et al. | |
| 2005/0149475 A1 | 7/2005 | Chkodrov et al. | |
| 2005/0149920 A1 | 7/2005 | Patrizi et al. | |
| 2005/0154695 A1 | 7/2005 | Gonzalez et al. | |
| 2006/0015528 A1 | 1/2006 | Hejlsberg et al. | |
| 2006/0085457 A1 | 4/2006 | Gelfand | |
| 2006/0085465 A1 | 4/2006 | Nori et al. | |
| 2006/0117029 A1 | 6/2006 | Yingst | |
| 2006/0130040 A1 * | 6/2006 | Subramanian et al. | 717/168 |
| 2006/0242381 A1 | 10/2006 | Shatskih et al. | |
| 2007/0038590 A1 | 2/2007 | Vijayan et al. | |
| 2007/0038651 A1 | 2/2007 | Bernstein et al. | |
| 2007/0061487 A1 | 3/2007 | Moore | |
| 2007/0079140 A1 | 4/2007 | Metzger et al. | |
| 2007/0106701 A1 | 5/2007 | Periyasamy | |
| 2007/0156849 A1 | 7/2007 | Becker | |
| 2007/0219951 A1 | 9/2007 | Ahmed et al. | |
| 2008/0098046 A1 * | 4/2008 | Alpern et al. | 707/203 |
| 2008/0201701 A1 | 8/2008 | Hofhansl et al. | |
| 2008/0243966 A1 | 10/2008 | Croisettier | |
| 2009/0006884 A1 | 1/2009 | Cahill | |
| 2010/0110474 A1 | 5/2010 | Coulter et al. | |
| 2010/0281458 A1 | 11/2010 | Paladino | |
| 2012/0222025 A1 | 8/2012 | Pandit | |
| 2013/0104115 A1 | 4/2013 | Bertrand | |
| 2013/0132936 A1 | 5/2013 | Wang | |
| 2014/0344798 A1 | 11/2014 | Sasaki | |

OTHER PUBLICATIONS

Advisory Action dated Jan. 26, 2010 for U.S. Appl. No. 11/444,571.

Davidson, Tom, "Managing Schema Changes (Part 2)," MSSSQL Server Development Customer Advisory Team, Mar. 31, 2006, Microsoft Cororation. Nov. 19, 2000 <http://blogs.msdn.com/sqlcat/archive/2006/O3/31/566046.aspx>.

Ambler, Scott, and Pramod Sadalage. Refactoring Databases: Evolutionary Database Design. Mar. 3, 2006.

Final Office Action dated Aug. 30, 2010 for U.S. Appl. No. 11/875,478.

Notice of Allowance dated Mar. 21, 2011 for U.S. Appl. No. 11/444,571.

Final Office Action dated Dec. 7, 2010 for U.S. Appl. No. 11/201,797.

Final Office Action dated Sep. 8, 2011 for U.S. Appl. No. 11/801,495.

Non-final Office Action dated Jan. 31, 2012 for U.S. Appl. No. 11/875,478.

Final Office Action dated Jan. 25, 2012 for U.S. Appl. No. 11/201,797.

Non-final Office Action dated Jun. 27, 2012 for U.S. Appl. No. 11/875,478.

Final Office Action dated Jan. 29, 2013 for U.S. Appl. No. 11/875,478.

Advisory Action dated Mar. 8, 2013 for U.S. Appl. No. 11/875,478.

Final Office Action dated Mar. 29, 2013 for U.S. Appl. No. 11/801,495.

Notice of Allowance dated Jun. 12, 2013 for U.S. Appl. No. 11/875,478.

Notice of Allowance dated Jan. 16, 2015 for U.S. Appl. No. 13/802,780.

Non-final Office Action dated Nov. 20, 2014 for U.S. Appl. No. 13/802,785.

Non-final Office Action dated Jul. 31, 2014 for U.S. Appl. No. 13/802,794.

Final Office Action dated Jan. 16, 2015 for U.S. Appl. No. 13/802,794.

"Oracle OLAP", Oracle, Jan. 3, 2012, 2 pages url: http://www.oracle.com/technetwork/database/options/olap/index.html.

"Introduction to Analytic Workspaces", Oracle OLAP DML Reference, 11g Release 1 (11.1), Part No. B28126-03, Oracle, Mar. 18, 2013, 2 pages url: http://docs.oracle.com/cd/B28359_01/olap.111/b28126/dml_basics004.htm.

Alan Choi, "Online Application Upgrade Using Edition-Based Redefinition", 2009, ACM.

Non-final Office Action dated Feb. 12, 2015 for U.S. Appl. No. 13/802,791.

Non-final Office Action dated Mar. 27, 2015 for U.S. Appl. No. 13/802,771.

Lassen et al. Experiences with object oriented development in PL!SQL, Center for Object Technology COT/4-18-V1.4, 2000.

Object Cache Navigation, Oracle Call Interface PRogrammer's Guide, Release 2 (9.2), Part No. A96584-10, 1996,2002.

Date et al, A Guide to SQL/DS, 1989, Addison-Wesley, Chapter 10.

Quest Software, Inc., LiveReorg.RTM., "Reorganization for the 24.times.7, Database," 2001.

Paapanen, Eric et al., "Oracle Database Application Developer's Guide—Large Objects", 10g Release 1 (10.1), Part No. B1079601, Apr. 21, 2008, 668 pages.

Smith, Jeff, "The Shortest, Fastest, and Easiest way to compare two tables in SQL Server: Union!", Jeff's SQL Server Blog 10, Apr. 22, 2008, 45 pages.

T-SQL, "sp_rename (T-SQL)", printed Apr. 22, 2008, 3 pages.

Scott Ambler et al., "Refactoring Databases: Evolutionary Database Design", Mar. 3, 2006, 7 pages.

Tom Davidson, Managing Schema Changes (Part 2), MSSQL Server Development Customer Advisory Teach, Mar. 31, 2006, Microsoft Corporation, Nov. 19, 2000, http://blgs.msdn.com/squlcat/archive/2006/03/31/566046.aspx, 11 pages.

(56) References Cited

OTHER PUBLICATIONS

Notice of Allowance dated May 11, 2015 for U.S. Appl. No. 13/802,780.
Notice of Allowance and Fees Due dated Oct. 21, 2015 for related U.S. Appl. No. 13/802,785.
Final Office Action dated Oct. 23, 2015 for related U.S. Appl. No. 13/802,771.
Non-final Office Action dated May 21, 2015 for U.S. Appl. No. 13/802,794.
Final Office Action dated Jun. 1, 2015 for U.S. Appl. No. 13/802,785.
Final Office Action dated Jul. 14, 2015 for U.S. Appl. No. 13/802,791.
Non-final Office Action dated Dec. 2, 2015 for related U.S. Appl. No. 13/802,791.
Notice of Allowance and Fee(s) Due dated Jan. 6, 2016 for related U.S. Appl. No. 13/802,794, 6 pages.

* cited by examiner

3A00

| Stripe | Col1 | Col2 |
|---|---|---|
| Edition1 | Col1_1 | Col2_1 |
| Edition1 | Col1_2 | Col2_2 |
| Edition1 | Col1_N | Col2_N |

} Run Edition of Seed Data $114_1$

| Stripe | Col1 | Col2 |
|---|---|---|
| Edition1 | Col1_1 | Col2_1 |
| Edition1 | Col1_2 | Col2_2 |
| Edition1 | Col1_N | Col2_N |
| Edition2 | Col1_1 | Col2_1 |
| Edition2 | Col1_2 | Col2_2 |
| Edition2 | Col1_N | Col2_N |

} Copy of Run Edition of Seed Data $114_1$

} Re-editioned Copy of Run Edition of Seed Data $114_1$

Patched Column 3C04

| Stripe | Col1 | Col2 | Col3 |
|---|---|---|---|
| Edition1 | Col1_1 | Col2_1 | |
| Edition1 | Col1_2 | Col2_2 | |
| Edition1 | Col1_N | Col2_N | |
| Edition2 | Col1_1 | Col2_1 | Col3_1 |
| Edition2 | Col1_2 | Col2_2 | Col3_2 |
| Edition2 | Col1_N | Col2_N | Col3_N |

} Patched Seed Data Table Copy 3C02

| Stripe | Col1 | Col2 | Col3 |
|---|---|---|---|
|  |  |  |  |
|  |  |  |  |
|  |  |  |  |
| Edition2 | Col1_1 | Col2_1 | Col3_1 |
| Edition2 | Col1_2 | Col2_2 | Col3_2 |
| Edition2 | Col1_3 | Col2_3 | Col3_3 |

} Delete Rows of Old Run Edition

FIG. 3D

ONLINE UPGRADING OF A DATABASE ENVIRONMENT USING TRANSPARENTLY-PATCHED SEED DATA TABLES

RELATED APPLICATIONS

The present application claims the benefit of priority to U.S. Provisional patent application Ser. No. 61/707,823, entitled "ONLINE PATCHING ORCHESTRATION", filed on Sep. 28, 2012, and U.S. Provisional patent application Ser. No. 61/707,827, entitled "CONFIGURATION CHANGE DETECTION AND PROPAGATION", filed on Sep. 28, 2012, and U.S. Provisional patent application Ser. No. 61/707,840, entitled "SYNCHRONIZING DOMAIN CONFIGURATION PARAMETERS", filed on Sep. 28, 2012, which are all hereby incorporated by reference in their entireties; and the present application is related to U.S. patent application Ser. No. 13/802,771, entitled "USING A DATA DICTIONARY TO DETERMINE AN UPGRADE EDITION OF A RELATIONAL DATABASE TABLE", filed on even date herewith, which is hereby incorporated by reference in its entirety; and the present application is related to co-pending U.S. patent application Ser. No. 13/802,780, entitled "TRANSPARENTLY UPGRADING DERIVED DATABASE OBJECTS", filed on even date herewith, which is hereby incorporated by reference in its entirety; and the present application is related to U.S. patent application Ser. No. 13/802,785, entitled "USING CONFIDENCE VALUES FOR SYNCHRONIZING FILE SYSTEMS", filed on even date herewith, which is hereby incorporated by reference in its entirety; and the present application is related to co-pending U.S. patent application Ser. No. 13/802,791, entitled "REDUCING DOWNTIME DURING UPGRADES OF INTERRELATED COMPONENTS IN A DATABASE SYSTEM", filed on even date herewith, which is hereby incorporated by reference in its entirety; and the present application is related to co-pending U.S. patent application Ser. No. 13/802,794, entitled "SYNCHRONIZATION OF CONFIGURATION CHANGES BETWEEN APPLICATIONS AND THEIR PLATFORMS", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of managing upgrades of database systems and more particularly to techniques for online upgrading of a database environment using transparently-patched seed data tables.

BACKGROUND

Some embodiments of the present disclosure are directed to an improved approach for implementing online upgrading of a database environment using transparently-patched seed data tables used by software applications running in the database environment.

During an upgrade of a computing environment, such as a computing environment having a relational database engine, it frequently occurs that both application code and application load data (e.g., initialization data, default data, forms, menus, etc.) need to be upgraded (e.g., up-revisioned). Legacy techniques often require that the application code and all application initialization data are upgraded at the same time. However that technique becomes impractical in modern systems at least in the aspect that modern systems may have hundreds of applications running, at least some of which are critical to the mission served by the computing environment, and should not be taken offline for long periods of time.

Other legacy techniques have partially addressed the foregoing problem by updating the application initialization data and restarting the application later at some convenient moment. Yet, this technique does not address the situation where both the application code and application load data need to be up-revisioned concurrently (e.g., to be sure that the code and data are synchronized to the same version).

Yet another legacy technique forces a coding standard onto application developers so the application would be aware of the occurrence of, and nature of, an up-revision of the application load data, however this techniques is both error prone and not scalable.

What are needed are techniques to transparently perform an upgrade of a computing environment that includes an upgrade of both application code and application load data. Further, what are needed are techniques to transparently perform an upgrade of a computing environment that eliminates the need for application programmers to write application code to manage upgrades.

Moreover, none of the aforementioned technologies have the capabilities to perform online upgrading of a database environment using transparently-patched seed data tables. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for online upgrading of a database environment using transparently-patched seed data tables.

A method, system, and computer program product for managing upgrades of database systems using a transparently-patched seed data table. The method commences on a running system by copying (while software applications are running) portions of data comprising a seed data table to database table rows that are temporarily inaccessible by the software applications. The copy operation creates new rows (a seed data table copy) in a database table. The method continues while software applications are running by modifying the seed data table copy (e.g., by applying a patch). For a brief time, the method stops the software applications, then changes the database table rows that were temporarily inaccessible by the software applications to become accessible by the software applications and restarts the software application to point to the patched seed data table copy. The patch can add or change a column of the seed data table copy or its schema.

Further details of aspects, objectives, and advantages of the disclosure are described below in the detailed description, drawings, and claims. Both the foregoing general description of the background and the following detailed description are

BRIEF DESCRIPTION OF THE DRAWINGS

FIG. 3A depicts a run edition table for online upgrading of a database environment using transparently-patched seed data tables, according to some embodiments.

FIG. 3B depicts a seed data table copy including a private copy of a run edition table for online upgrading of a database environment using transparently-patched seed data tables, according to some embodiments.

FIG. 3C depicts a patch edition table including a patched-in column for online upgrading of a database environment using transparently-patched seed data tables, according to some embodiments.

FIG. 3D depicts a cleaned-up patch edition table for online upgrading of a database environment using transparently-patched seed data tables, according to some embodiments.

DETAILED DESCRIPTION

Figure 1:
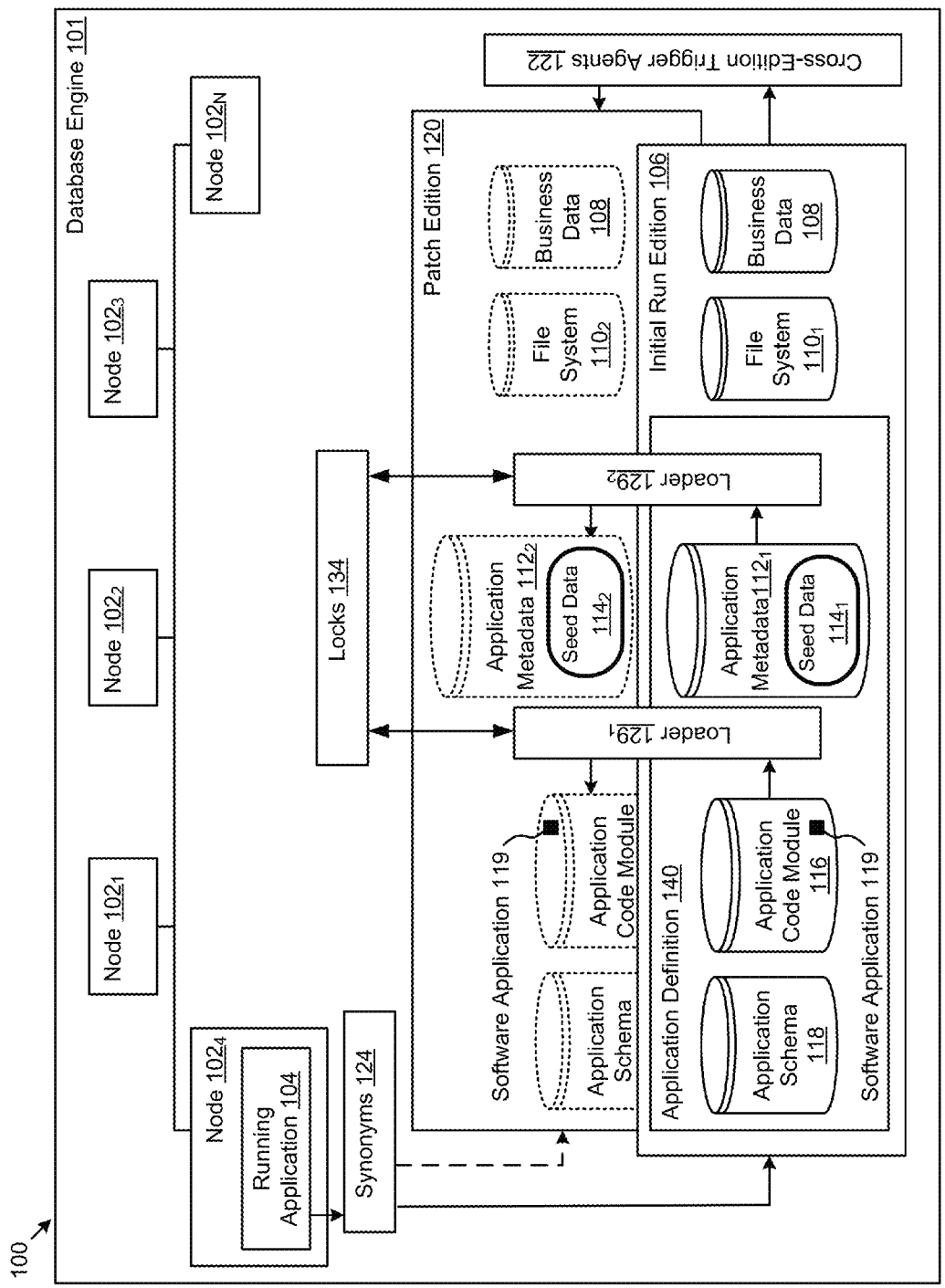
FIG. 1 depicts an example practice of online upgrading of a database environment using transparently-patched seed data tables, according to some embodiments.

Some embodiments of the present disclosure are directed to an improved approach for implementing online upgrading of a database environment using transparently-patched seed data tables. More particularly, disclosed herein are exemplary environments, methods, and systems for online upgrading of a database environment using transparently-patched seed data tables.

Overview

Described herein-below and in the accompanying figures are scalable methods and apparatus for implementing online upgrading of a database environment using transparently-patched seed data tables.

System downtime or other outage due to upgrading is a major concern in the design of enterprise-wide infrastructure and mission-critical systems. System downtime is especially serious for installations that are configured as a centralized installation, in turn serving many distributed installations. System outages can impact all operations, and system outages often incur great cost or risk when the system outage interferes with customer-related interactions (e.g., sales, service, payments, etc.) or other core activity (e.g., incoming inspection, manufacturing, etc.). The herein-disclosed techniques for upgrades of an installation-wide infrastructure (e.g., including patches or upgrades of software, applications and/ or software application services) facilitate the trend to deploying fewer enterprise-wide sites and fewer installations of mission-critical systems without adversely impacting business activities that rely on nearly non-stop uptime of their corresponding computing systems.

The upgrade techniques disclosed herein includes a set of features known as "seed data editioning". Seed data editioning enables application patches to be applied with dramatically reduced downtime by executing database patch actions on a copy (e.g., a "patch edition") of the runtime system. While an online patch is executing (e.g., patching the application code and patching the application seed data), the production application remains available and fully functional. Moreover, use of the herein-disclosed techniques serve to transparently perform an upgrade of a computing environment that includes an upgrade of both application code and application seed data, and without the need for application programmers to write application code to manage upgrades.

DEFINITIONS

Some of the terms used in this description are defined below for easy reference. The presented terms and their respective definitions are not rigidly restricted to these definitions—a term may be further defined by the term's use within this disclosure.

The term "application code" means computer code that is read into a processor instruction word register after being pointed to by the processor's program counter register. Examples include object code.

The term "application seed data" or "application load data" means data that is not read into a processor instruction word register, but nevertheless affects the behavior of the application. Examples include menu definitions, forms, text of displayed materials, etc.

The term "logic" means any combination of software or hardware that is used to implement all or part of the embodiments of the present disclosure.

A "module" includes any mix of any portions of computer memory and any extent of circuitry including hardwired logic or circuitry embodied as a processor.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1 depicts an example practice 100 of online upgrading of a database environment using transparently-patched seed data tables. As an option, the present practice 100 may be implemented in the context of the architecture and functionality of the embodiments described herein. Also, the practice 100 or any aspect therein may be implemented in any desired environment.

The depiction of the practice 100 introduces several concepts as shown and described herein. As shown, the installation comprises a database engine 101 which in turn comprises computing nodes (e.g., node $102_1$, node $102_2$, node $102_3$, node $102_4$, node $102_N$, etc.) any of which computing nodes can communicate with any other of the computing nodes. A software application (e.g., software application 119, running application 104) executes on a computing node and accesses stored data (e.g., business data 108, one or more instances of a file system (e.g., file system $110_1$, file system $110_2$, etc.). A software application can also access stored data in various application-specific embodiments (e.g., application metadata 112, application code modules 116, and application schema 118).

"Seed Data"

The shown application code module 116 serves to store one or more copies of one or more software applications, while the application metadata (e.g., application metadata $112_1$, application metadata $112_2$) serves to store data in an area that is specific to the application. The application metadata 112 can comprise application-specific data in the form of seed data 114, which can be used by the application to initialize data structures (e.g., screens, forms, menus, etc.) used by a running application. The application metadata 112 comprises application seed data (e.g., seed data $114_1$, seed data $114_2$, etc.), as shown. Application seed data may be embodied in many forms. For example, in the form of menu item descriptions, printable forms, help text in any language or help tooltips in any language, or any other sort of rows of data or tables. As described in detail herein, application seed data (e.g., seed data $114_1$, seed data $114_2$, etc.) can be embodied within a relational database, more specifically, in the form of an editioned data storage enabled table (see FIG. 3A through FIG. 3D).

The editioning concept (further described hereunder) operates such that a particular collection of interrelated components in a database system (e.g., application metadata 112, application code modules 116, application schema 118, business data 108, one or more instances of a file system 110, etc.) can be amalgamated into an "edition" (e.g., an initial run edition 106), which edition can them be subjected to transformations (e.g., data copies, data references, data conversions, etc.) into one or more other editions (e.g., patch edition 120), as shown.

In order to facilitate for minimizing downtime during upgrades of interrelated components in a database system, the collection of interrelated components are handled using the techniques disclosed herein. Strictly as an introductory example, an instance of a running application can access an initial run edition or a later designated run edition. Patching tools can access a patch edition, and/or an initial run edition and/or a later designated run edition. Various techniques for managing the timing and type of access and/or the timing and type of temporary inaccessibility are provided for by the loaders (e.g., loader $129_1$, loader $129_2$), and by use of synonyms 124. Specifically, the loader $129_1$, can access the application code module 116 from the initial run edition 106, and can obtain exclusive access via a semaphore or lock 134. Then, having exclusive access, the loader $129_1$, can apply any one or more patches to the application code, possibly into the application code module 116 from the patch edition 120. As an exemplary loading/locking scenario, an exclusive lock is acquired the first time a loader accesses a seed data table. The acquired lock can be used to ensure that only one instance of a loader (e.g., a loader for a particular table) assumes responsibility for making the initial copy of the data. Once the initial copy is made, any number of loaders can run in parallel against the table. In yet another scenario, any number of loaders (e.g., different instances of loader $129_2$) or a component of the loader $129_1$, can obtain exclusive access via a semaphore or lock 134. Then, having exclusive access, the loader $129_2$, can apply any modifications to the application metadata after making a complete editioned copy of seed data (e.g., see seed data $114_1$ in the initial run edition 106) to create a separate copy (e.g., see seed data $114_2$ within the patch edition 120). In exemplary cases, the seed data is embodied as one or more relational database tables, and can be "re-striped" during processing within the loader such that any row in the separate copy (seed data $114_2$) can be accessed using a WHERE clause in order to retrieve the original row data, or the editioned (and possibly patched) copy. In some systems, a technique for editioning is facilitated by automatically including a WHERE clause in any query statement that accesses any seed data table. The WHERE clause can be automatically determined on the basis of which edition the user refers to when establishing a database connection, and all or portions of this technique can be used for myriad objects including seed data tables.

Further details regarding a general approach to object editioning are described in U.S. Publication No. 2008-0098046 A1, which is hereby incorporated by reference in its entirety.

As can be recognized by those skilled in the art, a first instance of a running application can access and make changes to an initial run edition, and such changes can be detected and propagated to a patch edition using a cross-edition trigger agent 122. Thus, the second instance of the running application can access the changes that had been propagated to the patch edition.

The various techniques for copying, referencing, transforming and otherwise managing the location (e.g., physical copy, virtual copy, etc.) of data as well as techniques for managing the timing and type of access observed by the running application are discussed in detail infra.

Embodiments and Components in an Installation

A running installation of an suite of enterprise software applications comprises a vast and complex system made up of many individual parts that are broadly separated into a taxonomy as follows:

- A platform (e.g., storage hardware and software, servers, network components, OS, database hardware and software, middleware hardware and software, system management hardware and software, etc.), and
- One or more software applications (e.g., application code modules, application schema, code, application metadata, etc.)

Components within an installation can be further described as comprising:

Application Schema—Application schema codifies a relational data model for accessing items stored in the database engine 101 (e.g., tables, relationships, indexes, etc.). An instance of application schema defines the structure of the data being managed (e.g., it is not the data itself). The application schema is often managed while observing a two-layer approach comprising physical schema and logical schema:

The physical schema describes how information is actually stored in database tables.

The logical schema is a view of the relevant parts of the physical schema, which logical schema is presented to the application code modules.

Application Code Modules—These modules comprise application code (e.g., executable logic) that control (in part) how the application operates. Instances of application code modules run on the database, middle-tier application servers, and in client devices. Application code modules can be written in a variety of programming and/or scripting languages.

Application Metadata—This is data that participates in controlling how the application operates (e.g., initial look-and-feel, user customizations, etc.). This data can be stored in files on the files system, and/or in tables in a database. As earlier indicated metadata that is loaded into database tables is one form of seed data. In some cases, metadata can be altered during application runtime (see the online patching cycle of FIG. 2). Users and developers often edit application metadata to tailor functionality to their particular user-specific requirements.

Business Data—This often refers to customer-owned transaction data or reference data that is stored in accordance with the application schema. Uses of patches as herein-described can modify how business data is stored (e.g., corresponding to an instance of an application schema), however the patching embodiments herein do not explicitly create or explicitly delete customer business data.

The techniques described herein provide for online patching of applications (and respective application data) as well as for the online patching and online transformation of business data (e.g., transformation to an updated application schema).

Application Editions

A collection of schema, code and metadata definitions comprise an application definition 140. Components of the application definition may need to change over time, and the techniques herein prescribe how each part of the application definition are to be versioned and patched independently. Therefore, an application definition in a particular installation is known by a compound "version ID" comprised of the union of a version of all of its constituent parts. An installed collection of versioned part definitions is referred to as an application edition. In exemplary cases, an application definition is stored both on the file system and in the database. Further it is typical to store multiple application editions within one installation, and in such cases both the file system and database are used to hold a run edition version and a patch edition version of the application definition.

File System Editions

A file system edition is a set of the files that make up an application definition. The files may be organized into a hierarchical directory tree with a root directory. In some cases, the root directory path for an installation is stored in an operating system environment variable. It is possible to store multiple root directory trees in the same file system, and an operating system environment variable can point to any one of the multiple directory trees in that same file system.

In the context of the installation depicted and described in FIG. 1, and following the purpose and definition of an edition and an edition's constituent components, a cycle can be followed so as to upgrade constituent components (e.g., including application seed data) in a database system while maximizing the availability of the installation's functionality.

Figure 2:
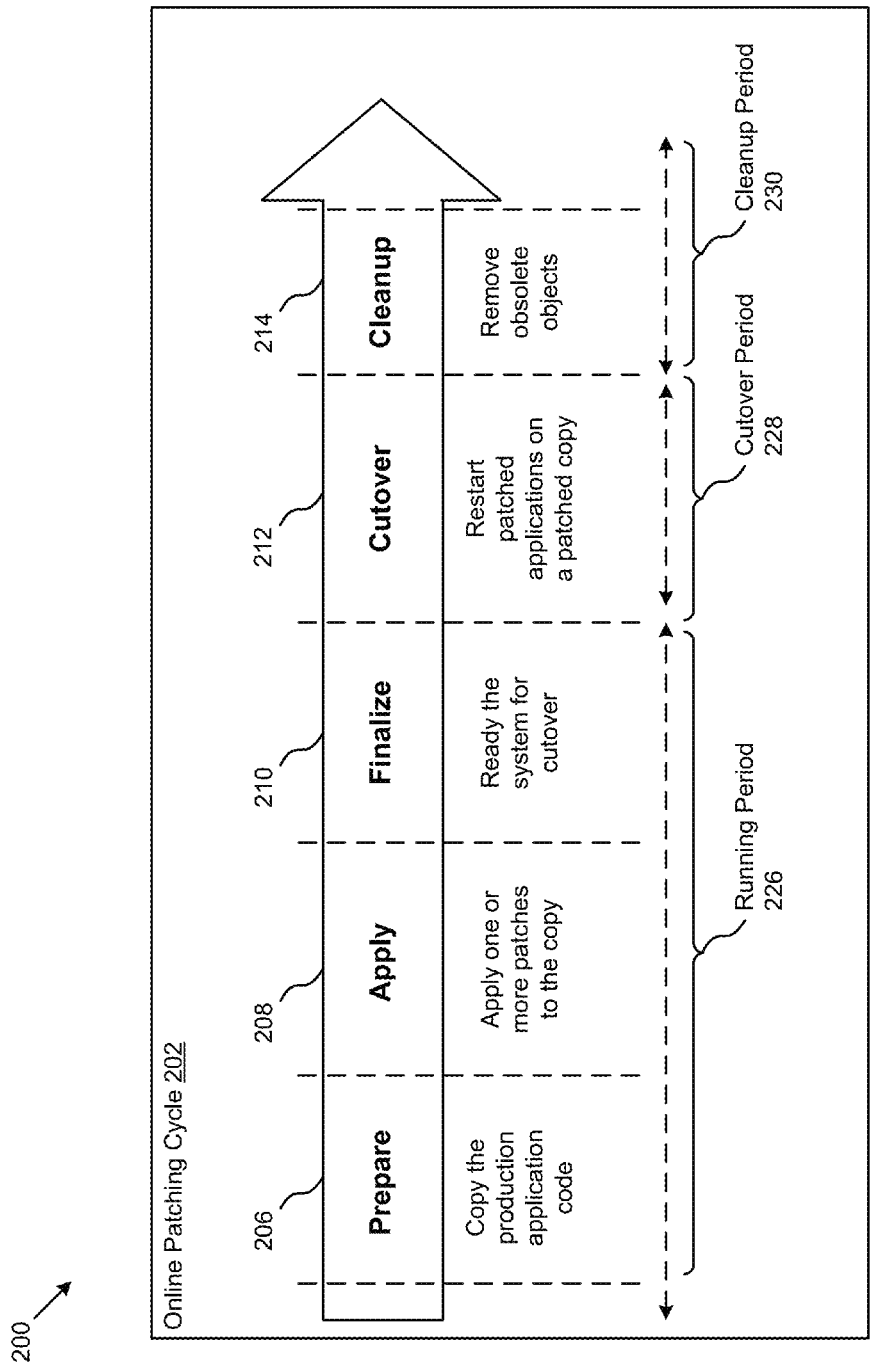
FIG. 2 depicts an online patching cycle for online upgrading of a database environment using transparently-patched seed data tables, according to some embodiments.

FIG. 2 depicts an online patching cycle 200 for online upgrading of a database environment using transparently-patched seed data tables. As an option, the present online patching cycle 200 may be implemented in the context of the architecture and functionality of the embodiments described herein. Also, the online patching cycle 200 or any aspect therein may be implemented in any desired environment.

To apply an online patch to an active/online installation, the installation is promoted through a series of sequential phases, which series is known as an online patching cycle. The shown online patching cycle 202 is given as:

PREPARE a patch edition (see online patch cycle prepare step 206).

APPLY a patch or patches to a patch edition (see online patch cycle apply step 208).

FINALIZE to get the system ready for cutover (see online patch cycle finalize step 210).

CUTOVER to patch edition (see online patch cycle cutover step 212).

Shutdown software applications and application services.

Set the patch edition as the new run edition.

Startup software applications and application services.

CLEANUP old objects or editions (see online patch cycle cleanup step 214).

As described in the above cycle, creating and patching relies on many specialized techniques to maintain a run edition (e.g., initial run edition 106) and a patch edition (e.g., patch edition 120) in the presence of continuously changing customer data in database tables (e.g., in the business data 108). The concept and implementation of the foregoing online patching cycle creates patch edition copies of application code modules, seed data, and other data in order to continuously apply patch transformations to runtime data that changes while the patch is executing.

The users can be all online users during the normal operation (e.g., during the running period 226), then for the brief period of the cutover (e.g., during the cutover period 228) the users are offline, to return online (e.g., in cleanup period 230) shortly after conclusion of the cutover period 228.

One embodiment supports full installation of online patching. Some installations comprise many products (e.g., hundreds of software application configurations, and many tens of thousands of tables). In such a case it is convenient to deploy every installation to contain all products (though only some may be licensed for a particular installation) and then to patch all products that are included in every installation. In this manner, all products can be periodically updated to stay current with the recommended code levels.

Implementing the above cycle to manage editionable components (include seed data) serves to minimize downtime during upgrades.

FIG. 3A depicts a run edition table 3A00 for online upgrading of a database environment using transparently-patched seed data tables. As an option, the present run edition table 3A00 may be implemented in the context of the architecture and functionality of the embodiments described herein. Also, the run edition table 3A00 or any aspect therein may be implemented in any desired environment.

As shown, run edition table 3A00 comprises two columns of data (e.g., see "Col1" and "Col2") to which is added a third "striping" column that holds an edition identifier (e.g., "Edition1", or "Edition2"), as shown.

FIG. 3B depicts a seed data table copy 3B00 including a private copy of a run edition table for online upgrading of a database environment using transparently-patched seed data tables. As an option, the present seed data table copy 3B00 may be implemented in the context of the architecture and functionality of the embodiments described herein. Also, the seed data table copy 3B00 or any aspect therein may be implemented in any desired environment.

The seed data table copy 3B00 comprises a copy of the run edition of the seed data which is striped (see leftmost column) to refer to "Edition1", and also comprises a further copy of the seed data which is also striped, this time to refer to "Edition2".

FIG. 3C depicts a patch edition table 3C00 including a patched-in column for online upgrading of a database environment using transparently-patched seed data tables. As an option, the present patch edition table 3C00 may be implemented in the context of the architecture and functionality of the embodiments described herein. Also, the patch edition table 3C00 or any aspect therein may be implemented in any desired environment.

The patch edition table 3C00 comprises all of the characteristics of the seed data table copy 3B00, and further comprises a patched column 3C04. In this manner, using the patched column, any application running in the initial run edition can access the seed data table and be unaware of the patching operation that adds the patching column. Furthermore, any instances of a patched version of an application can access the patch edition table 3C00 and is able to access the added patched column to create a patched seed data table copy.

In exemplary embodiments, the patch edition table 3C00 is formed as a result of modifying a seed data table copy by applying at least one patch to the seed data table copy to create a patched seed data table copy 3C02. Applying a patch to the seed data table copy to create a patched seed data table copy might comprise an addition of a column to the seed data table copy (e.g., see patched seed data table copy 3C02), or a change of the data type of a column in the seed data table copy, or a modification of a schema of the seed data table copy, or another modification to the seed data table copy.

FIG. 3D depicts a cleaned-up patch edition table 3D00 for online upgrading of a database environment using transparently-patched seed data tables. As an option, the present cleaned-up patch edition table 3D00 may be implemented in the context of the architecture and functionality of the embodiments described herein. Also, the cleaned-up patch edition table 3D00 or any aspect therein may be implemented in any desired environment.

The shown cleaned-up patch edition table 3D00 indicates a possible state of the seed data during the cleanup period 230.

A later state of the seed data just during the cleanup period 230 might collapse the empty rows.

Figure 4:
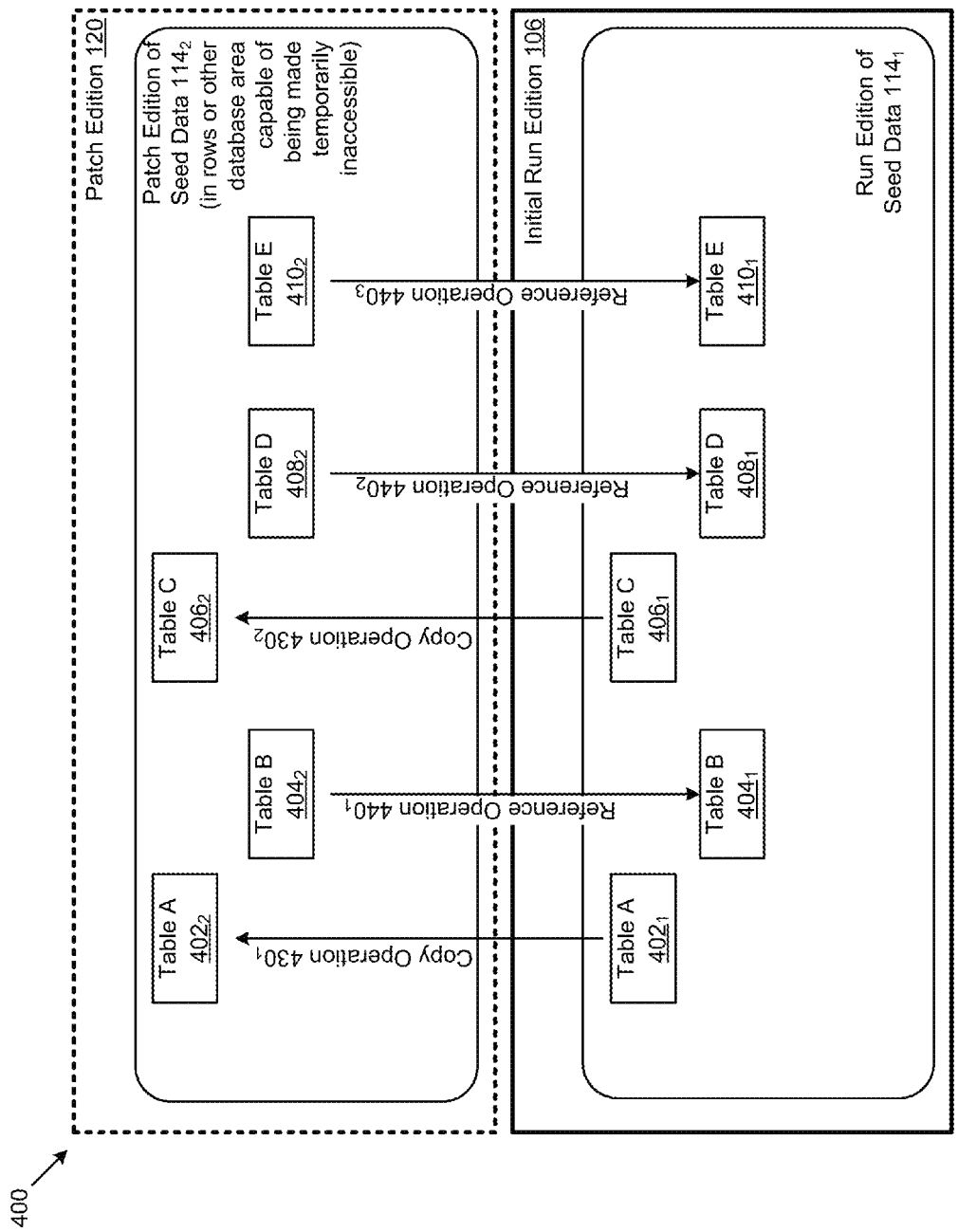
FIG. 4 is a schematic showing on-demand construction of editioned seed data for online upgrading of a database environment using transparently-patched seed data tables, according to some embodiments.

FIG. 4 is a schematic 400 showing on-demand construction of editioned seed data for online upgrading of a database environment using transparently-patched seed data tables. As an option, the present schematic 400 may be implemented in the context of the architecture and functionality of the embodiments described herein. Also, the schematic 400 or any aspect therein may be implemented in any desired environment.

As shown the seed data can comprise a plurality of tables (e.g., Table A ($402_1$, $402_2$), Table B ($404_1$, $404_2$), Table C ($406_1$, $406_2$), Table D ($408_1$, $408_2$), Table E ($410_1$, $410_2$)), and any one or more of the tables found in the initial run edition 106 (bottom portion of FIG. 4) can be copied to the patch edition 120 (see copy operation $430_1$, and copy operation $430_2$), or any one or more of the tables found in the initial run edition 106 can be referenced (and not physically copied) from the patch edition (see reference operation $440_1$, reference operation $440_2$, reference operation $440_3$).

In an exemplary implementation, a table is configured to be attached to a policy. Such a configuration facilitates the appropriate WHERE clause as earlier discussed. Initially a policy in the patch and run editions are the same. This indicates that the seed data has not been yet been configured and is therefore referencing the run edition rows.

TABLE 1

Run Edition Table With A First Edition Name Indication

| Edition Name | Column |
| --- | --- |
| E1 | A |
| E1 | B |
| E1 | C |

At some point, a patch edition is created; and at that moment in time, the policy for the run edition is the same as the policy for the patch edition. When a seed table is generated in preparation for defining a patch edition, a process copies the rows, indicates an edition name for the copied rows, and updates the policy.

TABLE 1

Run Edition Table With A First Edition and Second Edition Name

| Edition Name | Column |
| --- | --- |
| E1 | A |
| E1 | B |
| E1 | C |
| E2 | A |
| E2 | B |
| E2 | C |

The policy can be updated as follows:
Queries accessing the run edition has a policy of:
  WHERE EDITION_NAME=E1
Queries accessing the patch edition has a policy of:
  WHERE EDITION_NAME=E2

Figure 5A:
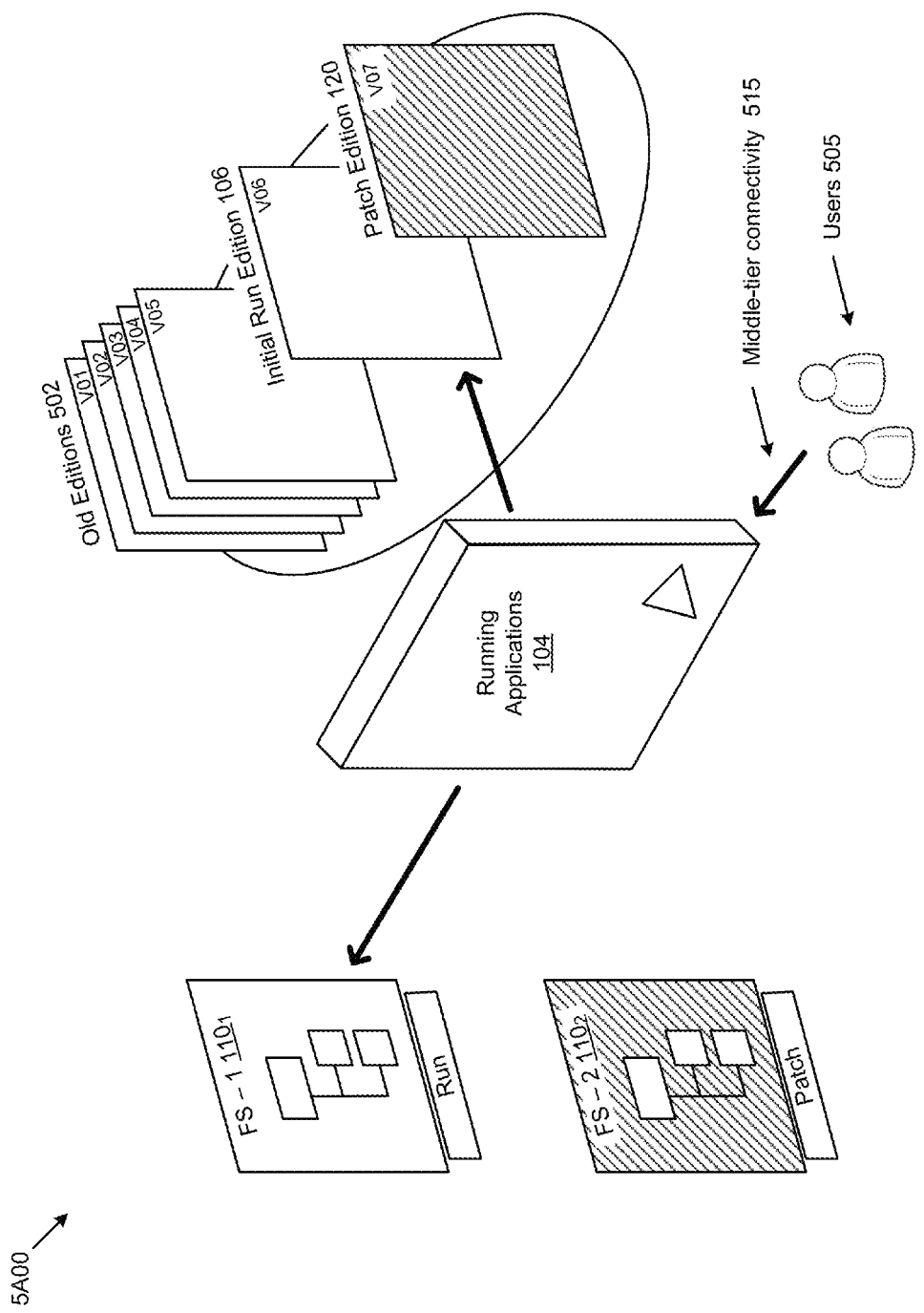
FIG. 5A is a sequence frame showing a running application in a multi-tier regime for online upgrading of a database environment using transparently-patched seed data tables, according to some embodiments.

FIG. 5A is a sequence frame 5A00 showing a running application in a multi-tier regime for online upgrading of a database environment using transparently-patched seed data tables. As an option, the present sequence frame 5A00 may be implemented in the context of the architecture and functionality of the embodiments described herein. Also, the sequence frame 5A00 or any aspect therein may be implemented in any desired environment.

The sequence frame 5A00 shows running applications 104 in a multi-tier regime where users 505 connect to a run file system (e.g., the file system $110_1$) and connect to a database (e.g., within initial run edition 106) via a middle tier connectivity 515. The database may comprise an initial run edition 106, a patch edition 120, and any number of old editions 502.

The connectivity and user's connections using said connectivity can persist through the running period 226 even during the time that various operations involved in the prepare step 206, the apply step 208, and the finalize step 210 may be performed.

Figure 5B:
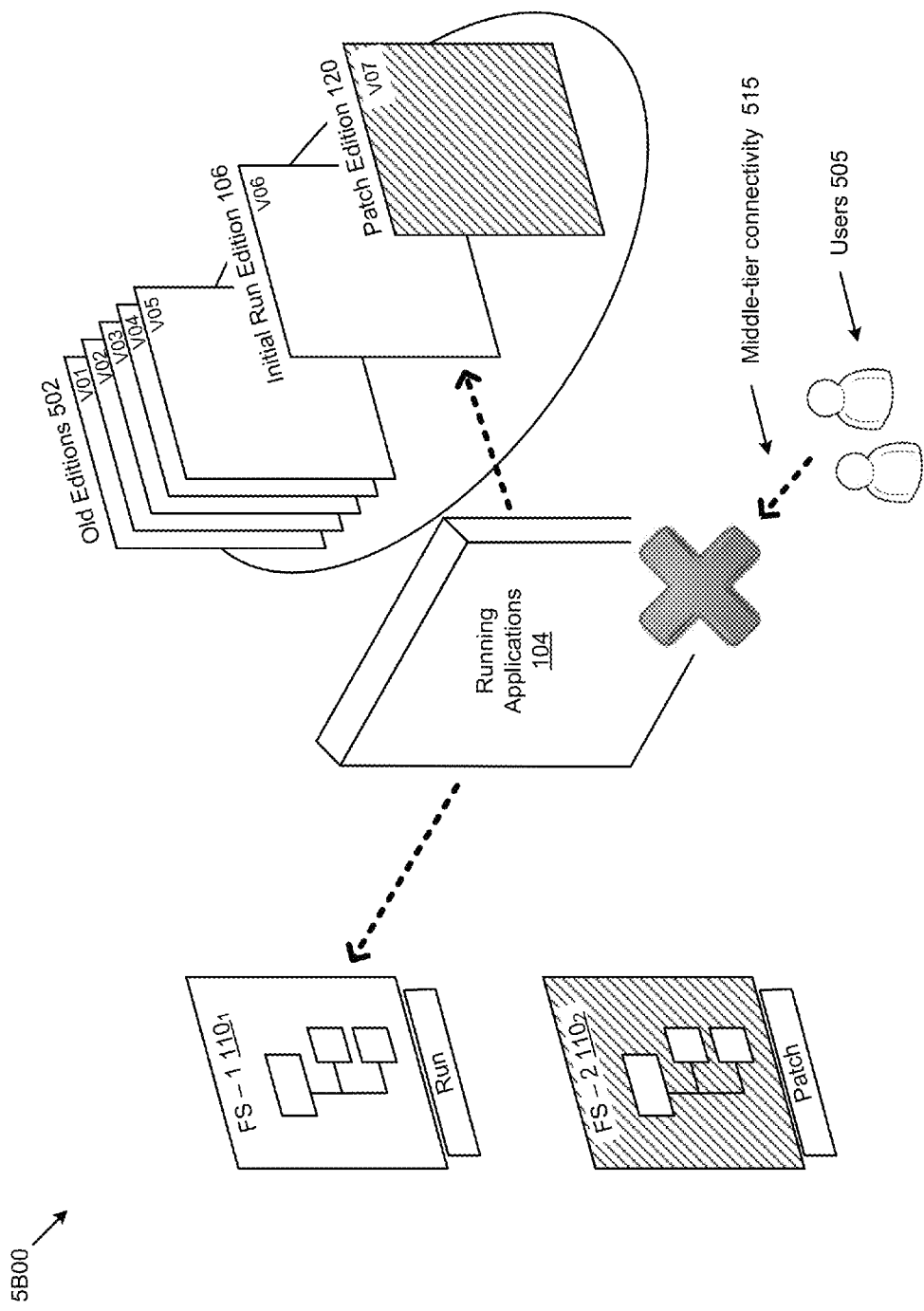
FIG. 5B is a sequence frame showing a disconnect operation in a multi-tier regime for online upgrading of a database environment using transparently-patched seed data tables, according to some embodiments.

FIG. 5B is a sequence frame 5B00 showing a disconnect operation in a multi-tier regime for online upgrading of a database environment using transparently-patched seed data tables. As an option, the present sequence frame 5B00 may be implemented in the context of the architecture and functionality of the embodiments described herein. Also, the sequence frame 5B00 or any aspect therein may be implemented in any desired environment.

The sequence frame 5B00 shows one embodiment of an orderly shutdown of running applications 104 in a multi-tier regime. In some instances, users 505 are advised to disconnect from the middle tier connectivity 515, and new connections are disallowed. Regardless of the lack of connections to the middle tier, various operations can persist through the running period 226 right up to the cutover period 228. During the running period 226 and through the cutover period 228 the database is not shutdown, and the file systems remain in existence and accessible. It is during this period that certain of the editioning operations can occur, including copy operations on seed data (e.g., see copy operation $430_1$, and copy operation $430_2$), or including referencing operations on any one or more of the tables found in the initial run edition 106 (see reference operation $440_1$, reference operation $440_2$, reference operation $440_3$).

At some moment during the running period, activity within the running applications and application services is quiesced in readiness for further online patch cycle operations (e.g., swap of editions, swap of file systems, and a restart of any patched applications and any patched application services).

Figure 5C:
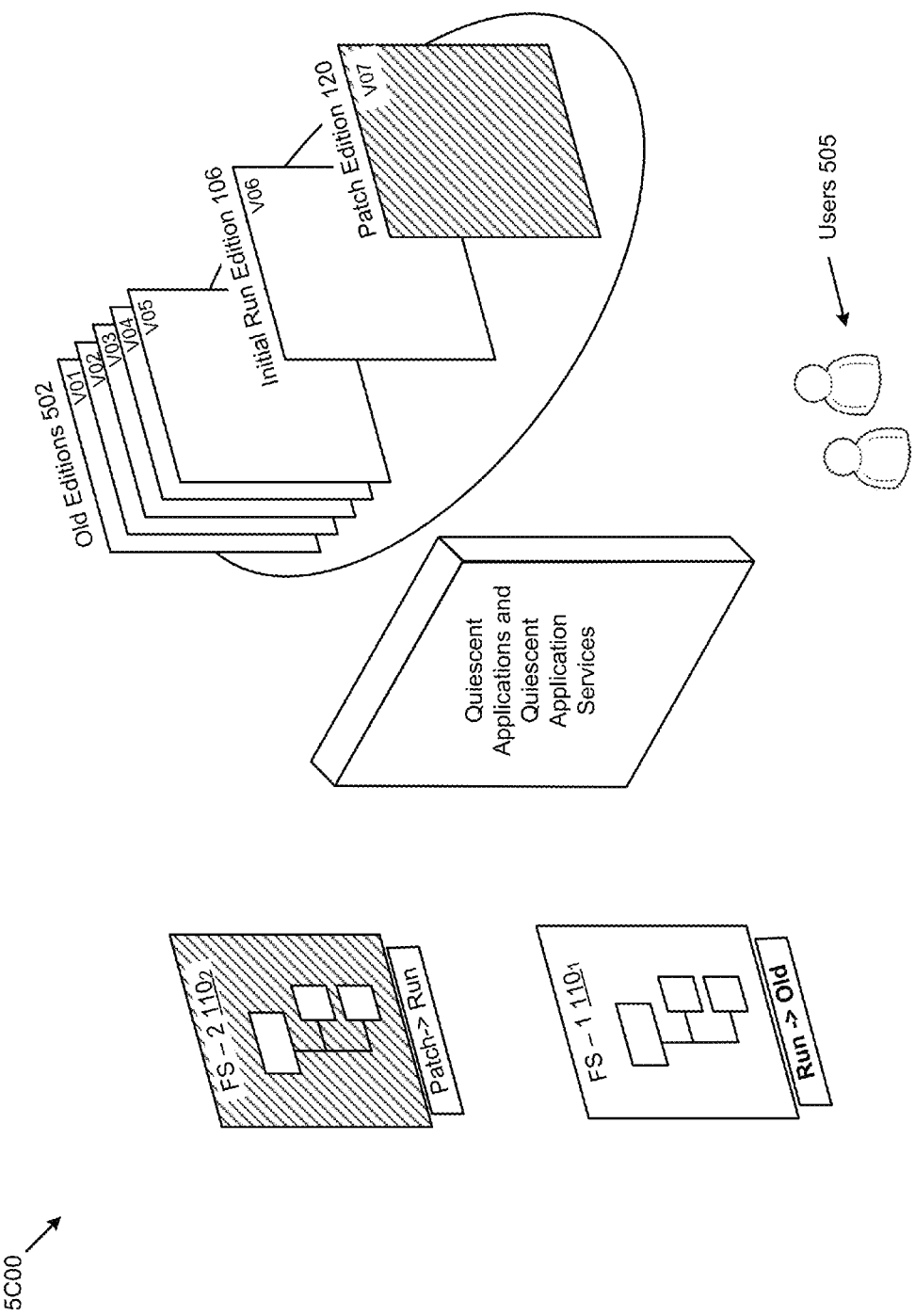
FIG. 5C is a sequence frame showing a file system swap operation in a multi-tier regime for online upgrading of a database environment using transparently-patched seed data tables, according to some embodiments.

FIG. 5C is a sequence frame 5C00 showing a file system swap operation in a multi-tier regime for online upgrading of a database environment using transparently-patched seed data tables. As an option, the present sequence frame 5C00 may be implemented in the context of the architecture and functionality of the embodiments described herein. Also, the sequence frame 5C00 or any aspect therein may be implemented in any desired environment.

As indicated in the discussion of FIG. 5B, at some moment during the running period, activity within the running applications is quiesced in readiness for further online patch cycle operations. One such operation serves to swap file systems $110_1$ such that the former patched version of the file system becomes the current run file system.

Figure 5D:
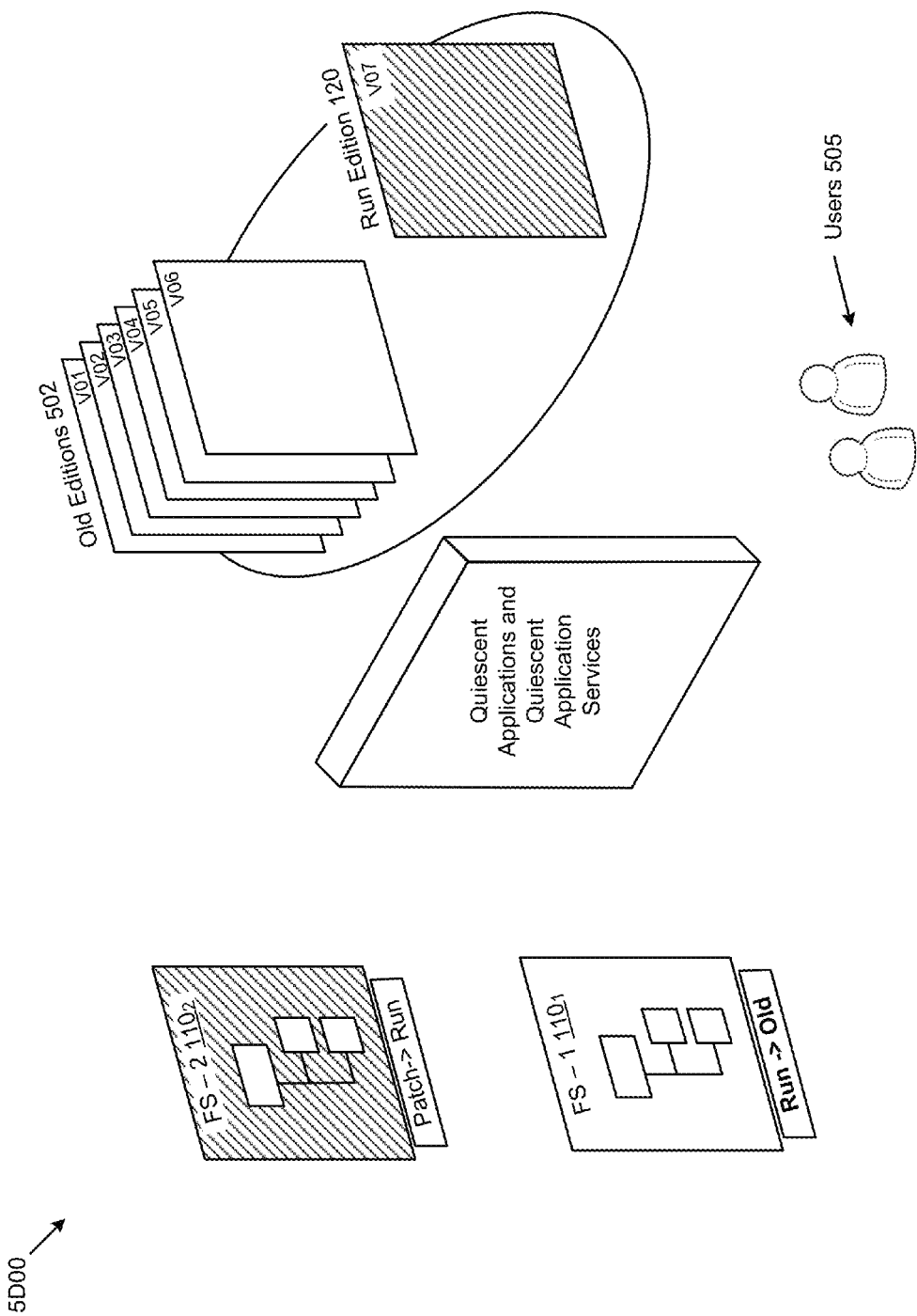
FIG. 5D is a sequence frame showing a patch edition promotion operation in a multi-tier regime for online upgrading of a database environment using transparently-patched seed data tables, according to some embodiments.

FIG. 5D is a sequence frame 5D00 showing a patch edition promotion operation in a multi-tier regime for online upgrading of a database environment using transparently-patched seed data tables. As an option, the present sequence frame 5D00 may be implemented in the context of the architecture and functionality of the embodiments described herein. Also, the sequence frame 5D00 or any aspect therein may be implemented in any desired environment.

Again, as indicated in the discussion of FIG. 5B, at some moment during the running period, activity within the running applications is quiesced in readiness for further online patch cycle operations. One such operation serves to database editions such that the former patch edition becomes the current run edition ($110_2$). In accordance with the descriptions above, the seed data had been copied or referenced, and re-striped (see FIG. 3A through FIG. 3D) in preparation for the cutover and cleanup periods, which periods are further detailed in the discussion of FIG. 5E.

Figure 5E:
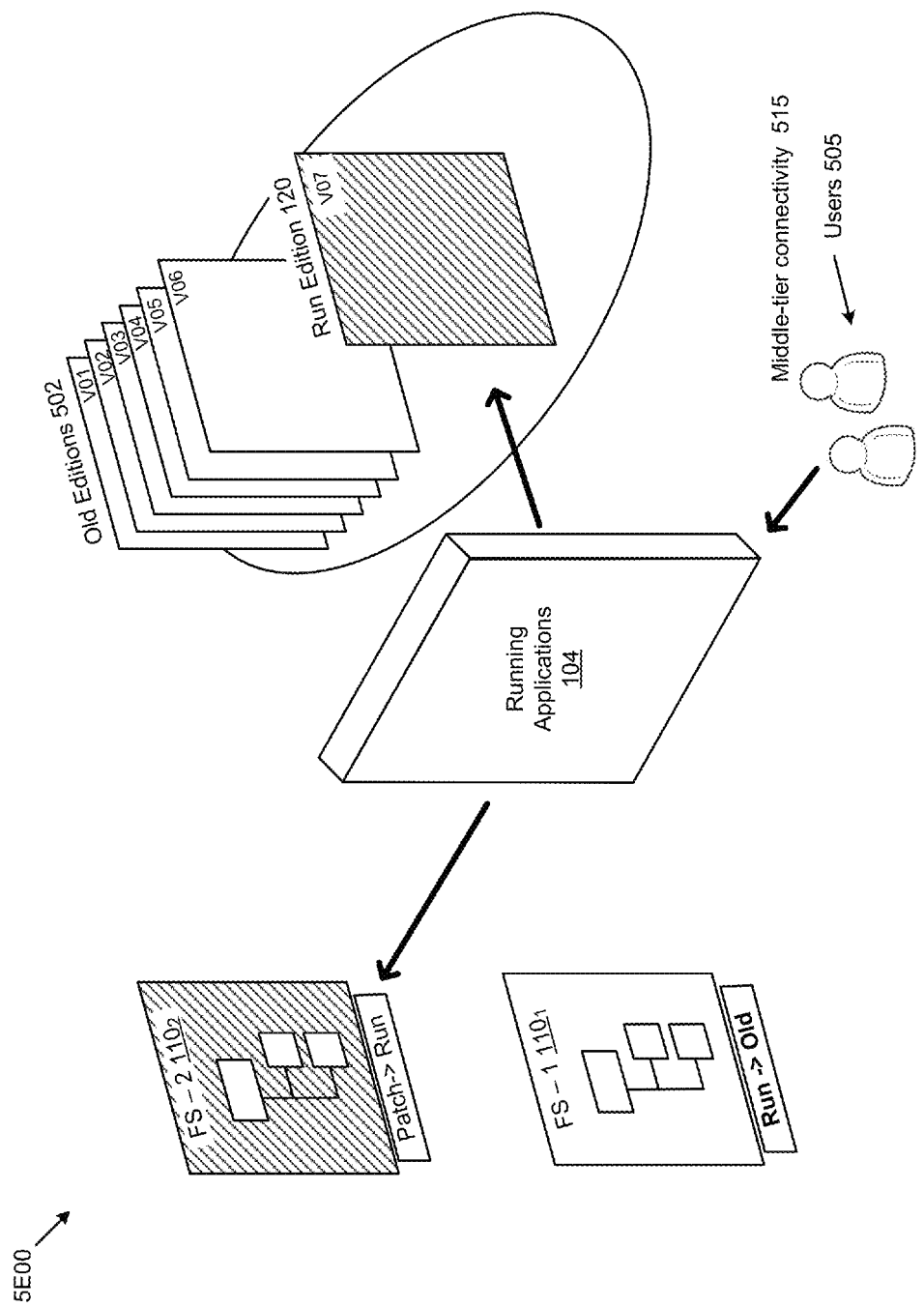
FIG. 5E is a sequence frame showing a reconnection operation in a multi-tier regime for online upgrading of a database environment using transparently-patched seed data tables, according to some embodiments.

FIG. 5E is a sequence frame 5E00 showing a reconnection operation in a multi-tier regime for online upgrading of a database environment using transparently-patched seed data tables. As an option, the present sequence frame 5E00 may be implemented in the context of the architecture and functionality of the embodiments described herein. Also, the sequence frame 5E00 or any aspect therein may be implemented in any desired environment.

The depiction of sequence frame 5E00 shows the state of the database environment at a point in time during the cutover period. The middle tier now refers to the patched file system (see FS-2 $110_2$), and refers to the promoted, patched database edition (see v07) which are now prepared to become the online version to be accessed by any patched applications and any patched application services, and are now prepared to become the online version to be accessed by users 505.

Figure 6:
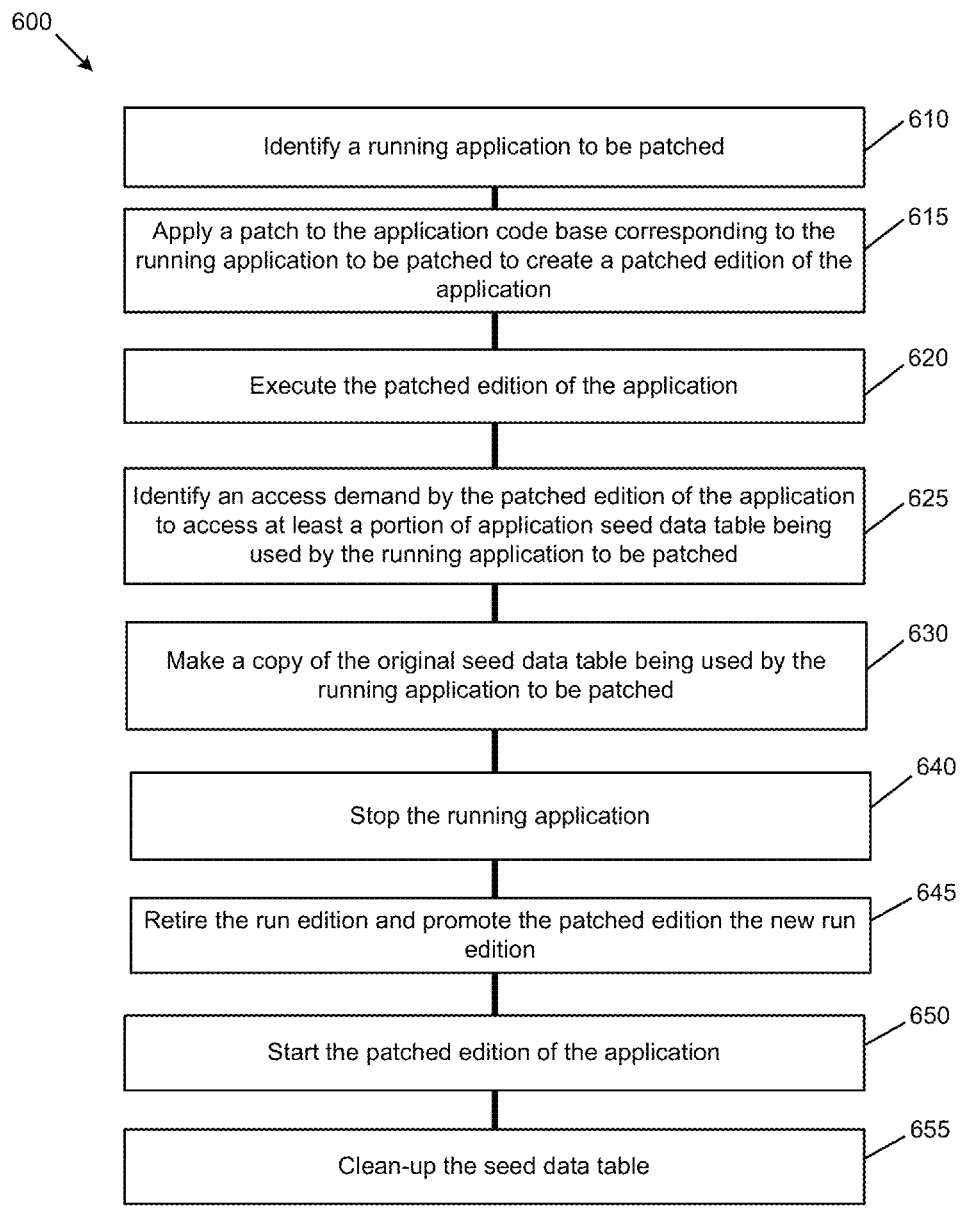
FIG. 6 is a diagram showing an example flow for online upgrading of a database environment using transparently-patched seed data tables, according to some embodiments.

FIG. 6 is a diagram showing an example flow 600 for online upgrading of a database environment using transparently-patched seed data tables. As an option, the present example flow 600 may be implemented in the context of the architecture and functionality of the embodiments described herein. Also, the example flow 600 or any aspect therein may be implemented in any desired environment.

The example flow 600 includes a possible series of steps, including some optional steps to be taken for online upgrading of a database environment using transparently-patched seed data tables. The example includes a description of on-demand construction of editioned seed data (refer again to FIG. 4). The example flow 600 proceeds as follows:

Identify a running application to be patched (see operation 610).

Apply a patch to the application code base (e.g., code base in an application code module 116) corresponding to the running application to be patched to create a patched edition of the application (see operation 615). Note that in exemplary environments, the operation to apply a patch to the application code base does not affect the corresponding running application; rather the corresponding running application might be stored in an operating system partition, possibly in a pagefile.

Execute the patched edition of the application (see operation 620). When the patched edition of the application executes, it may demand seed data, and the demanded seed data is copied or referenced (see steps below, and again see FIG. 4) so the patched application receives the demanded seed data whether or not the demanded seed data had been patched intentionally or had intentionally been not patched. Accordingly, the example flow 600 serves to identify an access demand by the patched edition of the application to access at least a portion of application seed data table being used by the running application to be patched (see operation 625).

Make a copy of the original seed data table being used by the running application to be patched (see operation 630). It can also occur that the seed data table to reflect the patched edition (e.g., the copy of operation 630) may not be the subject of any modifications by a patch. Further it is possible that the seed data table to reflect the patched edition may be updated through the functioning of any one or more cross-edition trigger agents 122, even though not explicitly subjected to modifications by a patch. For example, if the running applications performs inserts, or updates, or deletes to the seed data after the copy has been made then the changes is replayed into the patched copy. Such mechanisms include the aforementioned cross-edition triggers and cross-edition trigger agents 122.

At some point in time, it is appropriate to move through the online patching cycle 202 to enter the cutover period 228. Thus, at some moment in the running period 226, or after entry to the cutover period 228, the system will stop the running application (see operation 640).

Having stopped the running applications, the system will retire the run edition and promote the patched edition the new run edition (see operation 645). In many cases seed data may not have been patched, and/or any of the application that access a particular seed data table may not have been patched.

Start the patched editions of the applications, and any patched editions of the application services (see operation 650).

In the situation that the online patching cycle 202 is indeed planned to operate as a cycle (and to return to the first step after completing the last step), it is appropriate to clean up obsoleted objects. Thus in the context of upgrading a database environment using transparently-patched seed data tables, it is appropriate to delete the original rows of seed data (see operation 655).

Additional Embodiments of the Disclosure

Figure 7:
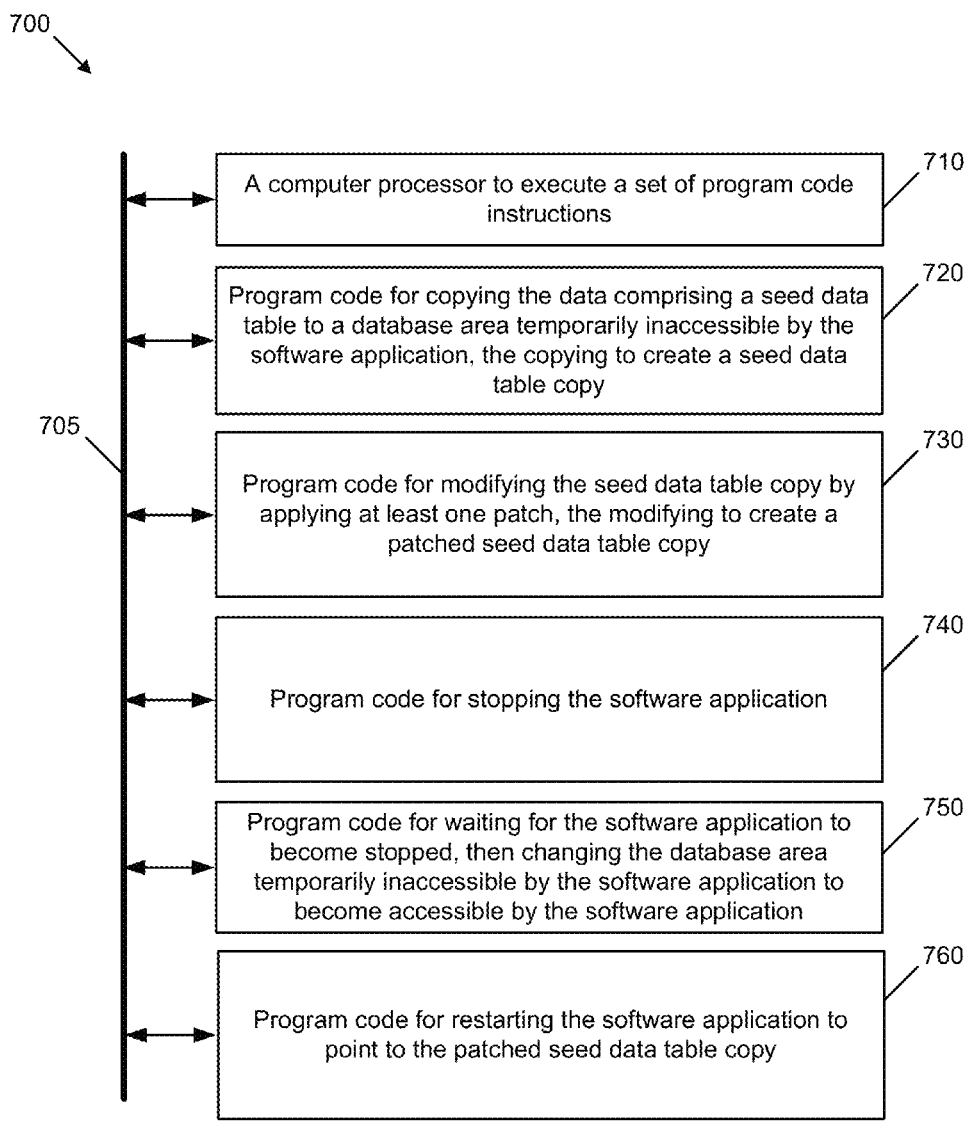
FIG. 7 shows a sub-system for online upgrading of a database environment using transparently-patched seed data tables, according to some embodiments.

FIG. 7 shows a sub-system for online upgrading of a database environment using transparently-patched seed data tables. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: copying the data comprising a seed data table to a database area temporarily inaccessible by the software application, the copying to create a seed data table copy (see module 720); modifying the seed data table copy by applying at least one patch, the modifying to create a patched seed data table copy (see module 730); signaling to the software application to stop (see module 740); waiting for the software application to become stopped, then changing the database area temporarily inaccessible by the software application to become accessible by the software application (see module 750); and restarting the software application to point to the patched seed data table copy (see module 760).

Figure 8:
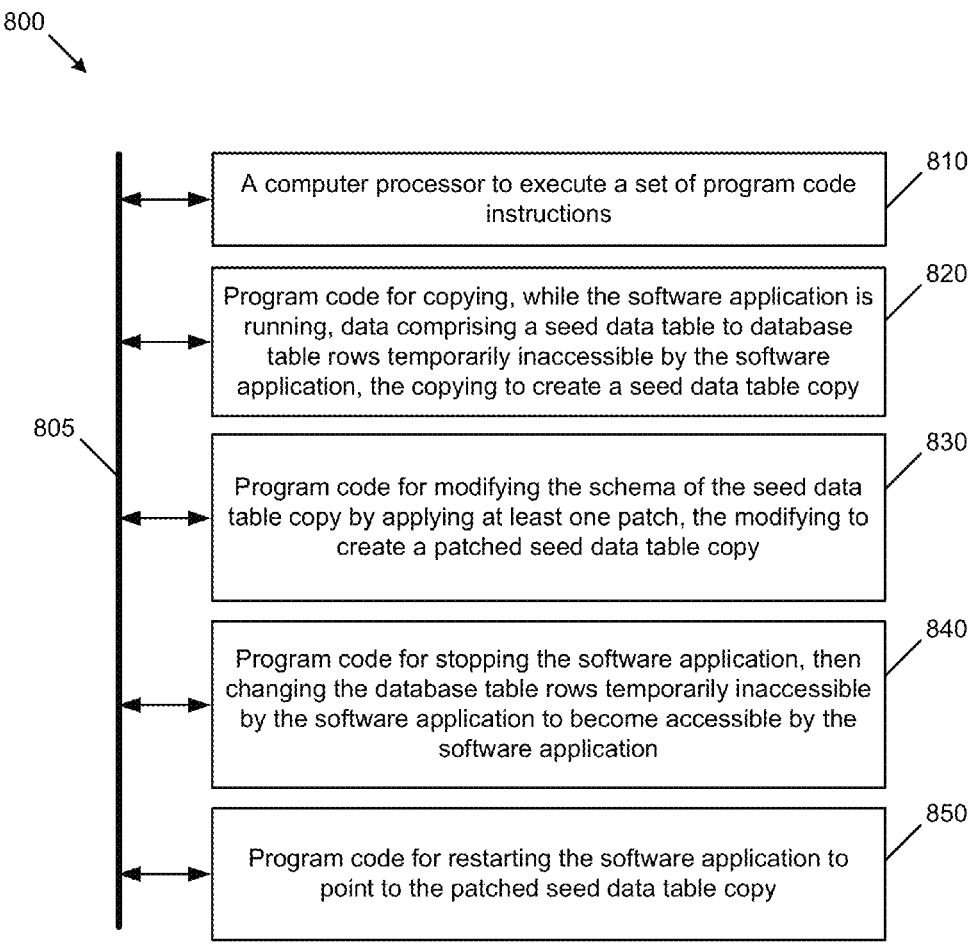
FIG. 8 shows a sub-system for online upgrading of a database environment using transparently-patched seed data tables, according to some embodiments.

FIG. 8 depicts a block diagram of a system to perform certain functions of a computer system. As an option, the present system 800 may be implemented in the context of the architecture and functionality of the embodiments described herein. Of course, however, the system 800 or any operation therein may be carried out in any desired environment. As shown, system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The embodiment of FIG. 8 implements a portion of a computer system, shown as system 800, comprising a computer processor to execute a set of program code instructions (see module 810) and modules for accessing memory to hold program code instructions to perform: copying, while the software application is running, data comprising a seed data table to database table rows temporarily inaccessible by the software application, the copying to create a seed data table copy (see module 820); modifying the schema of the seed data table copy by applying at least one patch, the modifying to create a patched seed data table copy (see module 830); stopping the software application, then changing the database table rows temporarily inaccessible by the software application to become accessible by the software application (see module 840); and restarting the software application to point to the patched seed data table copy (see module 850).

System Architecture Overview

Figure 9:
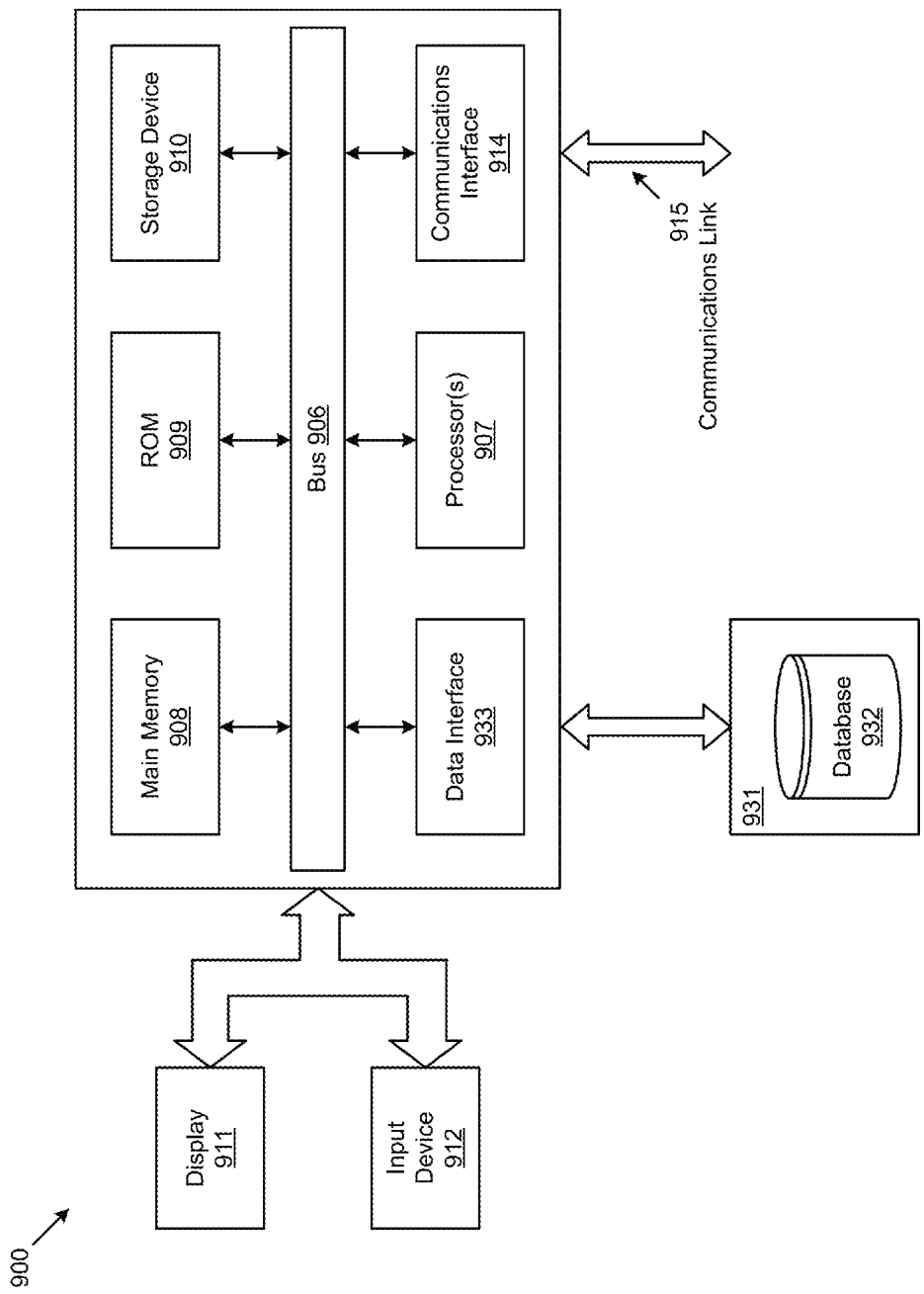
FIG. 9 depicts a block diagram of an instance of a computer system suitable for implementing an embodiment of the present disclosure.

FIG. 9 depicts a block diagram of an instance of a computer system 900 suitable for implementing an embodiment of the present disclosure. Computer system 900 includes a bus 906 or other communication mechanism for communicating information, which interconnects subsystems and devices, such as a processor 907, a system memory 908 (e.g., RAM), a static storage device (e.g., ROM 909), a disk drive 910 (e.g., magnetic or optical), a data interface 933, a communication interface 914 (e.g., modem or Ethernet card), a display 911 (e.g., CRT or LCD), input devices 912 (e.g., keyboard, cursor control), and an external data repository 931.

According to one embodiment of the disclosure, computer system 900 performs specific operations by processor 907 executing one or more sequences of one or more instructions contained in system memory 908. Such instructions may be read into system memory 908 from another computer readable/usable medium, such as a static storage device or a disk drive 910. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 900. According to certain embodiments of the disclosure, two or more computer systems 900 coupled by a communications link 915 (e.g., LAN, PTSN, or wireless network) may perform the sequence of instructions required to practice the disclosure in coordination with one another.

Computer system 900 may transmit and receive messages, data, and instructions, including programs (e.g., application code), through communications link 915 and communication interface 914. Received program code may be executed by processor 907 as it is received, and/or stored in disk drive 910 or other non-volatile storage for later execution. Computer system 900 may communicate through a data interface 933 to a database 932 on an external data repository 931. A module as used herein can be implemented using any mix of any portions of the system memory 908, and any extent of hard-wired circuitry including hard-wired circuitry embodied as a processor 907.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for online upgrading of a software application in a database environment using transparently-patched seed data, the transparently-patched seed data including initial data accessed by the software application that is upgraded to correspond to an upgrade to the software application, the method comprising:
    creating a copy of seed data by copying, while the software application is running, the seed data in database table rows from a data table to new database table rows in the data table that are temporarily inaccessible by the software application;
    applying at least one patch to modify the copy of the seed data in the data table;
    stopping the software application and changing the new database table rows temporarily inaccessible by the software application to become accessible by the software application; and
    starting the software application to point to the copy of the seed data that includes the new database table rows to which the at least one patch has been applied.

2. The computer implemented method of claim 1, further comprising at least one of adding a column to the data table, changing a data type of a column in the data table, modifying a schema of the data table, or adding an edition identifier to at least one column of the data table.

3. The computer implemented method of claim 2, starting the software application comprising initializing a menu or one or more forms for the software application with the copy of the seed data to which the at least one patch has been applied.

4. The computer implemented method of claim 1, further comprising applying the at least one patch to modify the copy of the seed data in the data table while the software application is not stopped.

5. The computer implemented method of claim 1, further comprising using a cross-edition trigger agent to apply a change to at least one row of the data table while the software application is running.

6. The computer implemented method of claim 1, further comprising:
    identifying a loader module that is stored at least partially in a non-transitory computer accessible storage medium;
    identifying at least one semaphore for the loader module;
    granting exclusive access to the new database table rows to the loader module by using the at least one semaphore during a time period when the copy of seed data is being created and the at least one patch is being applied;
    blocking access to at least the new database table rows in the data table at least while the copy of seed data is being created;
    applying the at least one patch by using the loader module;
    granting access to retrieve the seed data in the data table to one or more loader modules by using an SQL clause during the time period when the copy of seed data is being created and the at least one patch is being applied;
    granting access to retrieve the new database table rows in the data table to one or more loader modules by using an SQL clause during the time period when the copy of seed data is being created and the at least one patch is being applied;
    taking one or more users offline at least by stopping the software application;
    returning the one or more users online after the software application is started to point to the copy of the seed data;
    identifying one or more changes made by the initial run edition of the software application to the seed data;
    detecting and propagating the one or more changes to the new database table rows in the data table by using one or more cross-edition trigger agents;
    identifying an initial run edition of the software application including a first versioned application schema, a first versioned application code, and a first versioned metadata definitions;
    identifying an application patch that corresponding to the at least one patch including a second versioned application schema, a second versioned application code, and a second versioned metadata definitions; and
    synchronizing an upgrade to both the software application and the seed data at least by generating a patched edition for the software application at least by applying the application patch to the initial run edition of the software application.

7. The computer implemented method of claim 1, further comprising using a synonym in designating the new database table rows temporarily inaccessible by the software application to become accessible by the software application.

8. A computer system for online upgrading of a software application in a database environment using a transparently-patched seed data, the transparently-patched seed data including initial data accessed by the software application that is upgraded to correspond to an upgrade to the software application, comprising:
    a computer processor to execute a set of program code instructions; and
    a memory to hold the program code instructions, in which the program code instructions comprises program code which, when executed by the computer processor, causes the computer processor to:

create a seed data copy at least by copying, while the software application is running, the seed data in database table rows from a data table to new database table rows in the data table that are temporarily inaccessible by the software application;

apply at least one patch to modify the copy of the seed data in the data;

stop the software application and change the new database table rows temporarily inaccessible by the software application to become accessible by the software application; and start the software application to point to the copy of the seed data that includes the new database table rows to which the at least one patch has been applied.

9. The computer system of claim 8, wherein the at least one patch comprises at least one of, an addition of a column to the data table, a change of data type of a column in the data table, or a modification of a schema of the data table.

10. The computer system of claim 9, wherein the at least one patch comprises adding an edition identifier to at least one column of the data table.

11. The computer system of claim 8, further comprising program code which when executed by the computer processor, causes the computer processor to apply the at least one patch to modify the seed-data in the data table while the software application is not stopped.

12. The computer system of claim 8, further comprising program code which, when executed by the computer processor, causes the computer processor to use a cross-edition trigger agent to apply a change to at least one row of the data table while the software application is running.

13. The computer system of claim 8, further comprising program code which, when executed by the computer processor, causes the computer processor to apply an application code patch to a code base of the software application.

14. The computer system of claim 8, further comprising program code which, when executed by the computer processor, causes the computer processor to use a synonym to change the new database table rows temporarily inaccessible by the software application to become accessible by the software application.

15. A computer program product embodied in a non-transitory computer readable medium, the computer readable medium having stored thereon a sequence of instructions which, when executed by a processor causes the processor to execute a set of acts to implement online upgrading of a software application in a database environment using transparently-patched seed data including initial data accessed by the software application that is upgraded to correspond to an upgrade to the software application, the set of acts comprising:

creating a copy of seed data by copying, while the software application is running, the seed data in database table rows from a data table to new database table rows in the data table that are temporarily inaccessible by the software application;

applying at least one patch to modify the copy of the seed data in the data table;

stopping the software application and changing the new database table rows temporarily inaccessible by the software application to become accessible by the software application; and starting the software application to point to the copy of the seed data that includes the new database table rows to which the at least one patch has been applied.

16. The computer program product of claim 15, wherein the at least one patch comprises at least one of, an addition of a column to the data table, a change of data type of a column in the data table, or a modification of a schema of the data table.

17. The computer program product of claim 16, wherein the at least one patch comprises adding an edition identifier to at least one column of the data table.

18. The computer program product of claim 15, the set of acts further comprising applying the at least one path to modify the copy of the seed data in the data table while the software application is not stopped.

19. The computer program product of claim 15, the set of acts further comprising using a cross-edition trigger agent to apply a change to at least one row of the data table while the software application is running.

20. The computer program product of claim 15, the set of acts further comprising applying an application code patch to a code base of the software application.

* * * * *